3,166,574
PROCESS OF DEODORIZING γ-BUTYROLACTONE
David E. Gensheimer and Andrew S. Wood, Paducah, Ky., assignors to General Aniline & Film Corporation, New York, N.Y., a corporation of Delaware
No Drawing. Filed Oct. 9, 1963, Ser. No. 314,847
7 Claims. (Cl. 260—343.6)

The present invention relates to the process of deodorizing a γ-butyrolactone.

Dehydrogenation of butane-1-4-diol either in the liquid or vapor phase in the presence of a copper catalyst yields γ-butyrolactone with a small quantity of tetrahydrofuran, water and traces of acetone and butyraldehyde. The latter are removed by simple distillation at atmospheric pressure followed by vacuum distillation to give γ-butyrolactone, a colorless liquid, which boils at 204° C. at atmospheric pressure. The resulting colorless liquid possesses a rank residual odor comparable to dirty, sweaty socks. The offensive odor is highly objectionable when the γ-butyrolactone is to be employed in the formulation of cosmetic preparations such as lotions, face creams, lipsticks, finger nail polish removers, etc. The odor is much more highly pronounced when the γ-butyrolactone is employed as a solvent for softening cellophane, parchment and other papers.

In view of the resemblance of the rank odor to rancid butter, it would appear that the odor producing substance in the γ-butyrolactone may be butyric acid and that mere neutralization thereof with alkali should yield a deodorized product. Unfortunately, however, γ-butyrolactone is subject to rapid alkaline-hydrolysis so that sufficient alkali would not be retained in a homogeneous system. In other words, γ-butyrolactone is sensitive to alkali metal hydroxides and in contact therewith the lactone ring opens and yields the salt of γ-hydroxybutyric acid. The alkali metal salts are soluble in the γ-butyrolactone and as a consequence would contaminate the product with an undesirable impurity.

It is the principal object of the present invention to provide a process of removing the offensive odor without materially affecting the γ-butyrolactone.

Other objects and advantages will become more clearly manifest from the following description.

We have discovered that the offensive odor is readily removed by treating anhydrous γ-butyrolactone with either an oxide or hydroxide of metals such as calcium, magnesium, barium and strontium, or basic anion exchange resins, in the hydroxide form, which are fully described by Kunin and Myers in their text book "Ion Exchange Resins" published in 1950 by John Wiley, N.Y. city, N.Y. and commercially available under brand names such as, for example, Rexyn 1, Dowex 1, Dowex 2, Amberlite IRA–400, Permutit 3, etc. They are generally prepared by copolymerizing styrene with p-divinylbenzene, chlormethylating the polymer and converting the resulting polymeric benzyl chloride to quaternary ammonium chloride. Such resins and the aforementioned oxides and hydroxides adsorb the odor producing substance, are insoluble in the γ-butyrolactone and are readily removed by filtration.

The amount of oxide or hydroxide of the aforementioned metals and the basic anion exchange resins, hereinafter for sake of brevity referred to as adsorbant, to be employed in treating the γ-butyrolactone is not critical. As little as one part by weight of adsorbant is sufficient to treat from thirty to one hundred parts by weight of γ-butyrolactone. The treatment simply consists of contacting the γ-butyrolactone with the adsorbant for at least one minute. The treatment may consist of adding the adsorbant to the γ-butyrolactone at room temperature stirring for at least one minute followed by filtration. The filtrate is free from the offensive odor and remains so after several months of storage at room temperature in shipping containers such as bottles and drums. The treatment may also be applied to a continuous treating tower containing the adsorbant in granulated or large particle size.

The adsorbants have a long deodorizing action and are used over and over again until such time when the filtrate emanates a faint offensive odor at which time it is discarded and fresh adsorbant medium used.

The following illustrative examples will show how the adsorbants may be employed in the treatment of anhydrous γ-butyrolactone.

*Example I*

Sixty grams of γ-butyrolactone with an offensive odor was shaken for one minute with two grams of powdered calcium hydroxide and filtered. The filtrate had a sweet odor and when placed in a screw tight bottle on the shelf for three months was sweet smelling.

*Example II*

Fifty grams of powdered magnesium hydroxide were added into three kilograms of γ-butyrolactone with a rank odor and agitated for a few minutes. The magnesium hydroxide was permitted to settle and the supernatant liquid filtered. The filtrate had a sweet odor and when a small quantity thereof was placed in a screw tight bottle and placed on a laboratory shelf, the odor remained sweet after six months.

*Example III*

Into a continuous treating tower approximately ten feet tall and with an internal diameter of 18" there was placed at the bottom thereof a screen of 3/16" mesh over which were uniformly spread out five pounds of the anion exchange resin commercially obtained under the brand name of Dowex 100. Three hundred gallons at the rate of a gallon per minute of γ-butyrolactone with a rank odor were passed through the tower and collected in a receiving tank followed by filtration. The filtrate has a sweet odor.

*Example IV*

Ten grams of barium hydroxide was slurried with ten liters of γ-butyrolactone having a rank odor, agitated for one hour and filtered. The filtrate has a sweet odor.

*Example V*

To 10,000 pounds of γ-butyrolactone (having a rank odor) in a 4,000 gallon stainless steel kettle were added 150 pounds of pulverized hydrated lime and 35 pounds of Nuchar C. The suspension was agitated for two hours, filtered and clarified with 50 pounds of Celatom (diatomaceous earth). The filtrate has a sweet odor.

*Example VI*

Example III was repeated with the exception that the anion exchange resin was replaced by five pounds of hydrated lime. The filtrate has a sweet odor.

We claim:
1. The process of deodorizing γ-butyrolactone which comprises contacting said lactone with a deodorizing amount of a member selected from the class consisting of oxide and hydroxide of calcium, barium, magnesium, and strontium, and anion exchange resin in the hydroxide form.
2. The process of deodorizing γ-butyrolactone which comprises contacting said lactone with a deodorizing amount of calcium hydroxide.
3. The process of deodorizing γ-butyrolactone which comprises contacting said lactone with a deodorizing amount of strontium hydroxide.
4. The process of deodorizing γ-butyrolactone which comprises contacting said lactone with a deodorizing amount of magnesium hydroxide.
5. The process of deodorizing γ-butyrolactone which comprises contacting said lactone with a deodorizing amount of hydrated lime.
6. The process of deodorizing γ-butyrolactone which comprises contacting said lactone with a deodorizing amount of barium hydroxide.
7. The process of deodorizing γ-butyrolactone which comprises contacting said lactone with a deodorizing amount of anion exchange resin in the hydroxide form.

References Cited in the file of this patent
MCI Chemical Abstracts, vol. 54 (1960), page 4393.